US009443444B2

United States Patent
Moriyasu

(10) Patent No.: US 9,443,444 B2
(45) Date of Patent: *Sep. 13, 2016

(54) FIGURE PLATE SET

(71) Applicant: PASCAL CO., LTD., Kurashiki-shi, Okayama (JP)

(72) Inventor: Hiroki Moriyasu, Kurashiki (JP)

(73) Assignee: PASCAL CO., LTD., Kurashiki-shi, Okayama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/718,095

(22) Filed: May 21, 2015

(65) Prior Publication Data

US 2015/0255003 A1    Sep. 10, 2015

Related U.S. Application Data

(63) Continuation of application No. PCT/JP2013/084434, filed on Dec. 24, 2013.

(30) Foreign Application Priority Data

Dec. 28, 2012   (JP) ................. 2012-287213

(51) Int. Cl.
    *G09B 23/04* (2006.01)
    *A63F 9/06* (2006.01)
    *G09B 1/02* (2006.01)

(52) U.S. Cl.
    CPC .............. *G09B 23/04* (2013.01); *A63F 9/0669* (2013.01); *G09B 1/02* (2013.01); *A63F 2009/0697* (2013.01)

(58) Field of Classification Search
    USPC ....... 434/188, 191, 196, 205, 208, 211, 212, 434/214
    See application file for complete search history.

(56) References Cited

U.S. PATENT DOCUMENTS 143,835 A * 10/1873 Muller .................. A63H 33/04
                                              273/157 R
342,651 A *  5/1886 Southworth ........... G09B 19/02
                                              434/196

(Continued)

FOREIGN PATENT DOCUMENTS

JP        S48-015175 Y    4/1973
JP        S55-034859 U    3/1980

(Continued)

OTHER PUBLICATIONS

International Search Report for PCT/JP2013/084434 dated Apr. 1, 2014.

(Continued)

*Primary Examiner* — Kurt Fernstrom
(74) *Attorney, Agent, or Firm* — Yokoi & Co., U.S.A.; Toshiyuki Yokoi

(57) ABSTRACT

The present invention provides a figure plate set (10) for learning that comprises a plate member (4) having a concave portion (5); and groups of figure plates (1, 2, 3) that can form a regular polygon by being combined together, wherein the group of figure plates (1, 2, 3) can be stored on concave portion (5) in a state that the regular polygon is formed and the regular polygon is inscribed in an inner peripheral wall (6) of the concave portion (5). From the above, the user can experientially understand the regular polygon through the work of combining the figure plates. Thus, ability of geometric thinking about regular polygon is increased. In addition, since the plate member (4) has the concave portion (5), the group of figure plates (1, 2, 3) can be positioned. Thus, the figure plates (1, 2, 3) can be combined easily.

7 Claims, 21 Drawing Sheets

(56) References Cited

U.S. PATENT DOCUMENTS

| | | | | |
|---|---|---|---|---|
| 1,173,298 | A * | 2/1916 | Montessori | G09B 23/04 434/211 |
| 1,261,710 | A * | 4/1918 | Coyle | A63F 9/10 273/157 R |
| 2,611,193 | A * | 9/1952 | Davis | G09B 19/02 434/196 |
| 2,885,207 | A * | 5/1959 | Wormser | A63F 9/10 273/157 R |
| 3,614,835 | A * | 10/1971 | Rice | F16B 5/0607 434/211 |
| 3,637,217 | A * | 1/1972 | Kent | A63F 9/12 273/157 R |
| 4,343,471 | A * | 8/1982 | Calvert | A63F 9/0669 273/157 R |
| 4,723,382 | A * | 2/1988 | Lalvani | E04B 1/3211 273/157 R |
| 4,913,436 | A * | 4/1990 | Li | A63F 9/10 273/157 R |
| 5,215,467 | A * | 6/1993 | Brischke | G09B 23/04 434/211 |
| 5,281,145 | A * | 1/1994 | Sidrak | G09B 23/04 434/211 |
| 5,470,234 | A * | 11/1995 | Sher | G09B 23/02 434/196 |
| 5,873,729 | A * | 2/1999 | Aghevli | G09B 1/40 273/157 R |
| D429,775 | S * | 8/2000 | Adelman | D21/478 |
| 6,145,837 | A * | 11/2000 | Silvey | A63F 9/12 273/157 R |
| 6,575,755 | B2 * | 6/2003 | Dreyfous | G09B 19/02 434/196 |
| 8,834,167 | B2 * | 9/2014 | Spotts | G09F 7/02 434/195 |
| 2006/0076732 | A1 * | 4/2006 | Chiou | A63F 9/10 273/153 R |

FOREIGN PATENT DOCUMENTS

| | | |
|---|---|---|
| JP | H09-285642 A | 11/1997 |
| JP | 3149263 U | 2/2009 |

OTHER PUBLICATIONS

PCT written opinion dated Apr. 1, 2014.

\* cited by examiner

FIGURE PLATE SET

CROSS-REFERENCES TO RELATED APPLICATIONS

This Application claims the benefit of priority and is a Continuation application of the prior International Patent Application No. PCT/JP2013/084434, with an international filing date of Dec. 24, 2013, which designated the United States, and is related to the Japanese Patent Application No. 2012-287213, filed Dec. 28, 2012, the entire disclosures of all applications are expressly incorporated by reference in their entirety herein.

BACKGROUND OF THE INVENTION

1. Field of the Invention

The present invention relates to a figure plate set for learning.

2. Description of Related Art

Figure plates can be used as a learning material for understanding figures and geometry. If a plurality of figure plates is prepared and a combination of an arrangement of the figure plates is changed in a planar shape, various figures having different outer shapes can be formed. This helps a user to understand characteristics of the figures.

For example, in a teaching blackboard for calculating area of plane figures disclosed in Patent Document 1, a plurality of figure plates having a triangular shape is provided. On the blackboard, a combination of an arrangement of the figure plates is arbitrarily changed, and an outer shape formed by the plurality of figure plates can be changed to various triangles, a rectangle, and a parallelogram. This helps the user to understand various basic figures and calculation method of an area of various figures.

In addition, in a figure puzzle disclosed in Patent Document 2, four triangular cards are provided. By combining the triangular cards, basic shapes of the figure, such as a regular tetragon, a rectangle, a parallelogram, a rhombus, a trapezoid, and a triangle can be formed. By the above configuration, the user can operationally and visually understand basic shapes of the figure.

[Patent Document 1] Japanese examined utility model application publication No. S48-15175.

[Patent Document 2] Japanese unexamined utility model application publication No. S55-34859.

Although the figure plates and the triangular cards described above can help the user to understand the basic shapes generally, they are not suitable for helping the user to deepen the understanding of geometric thinking related to the figure. In other words, even if the figure plates and the triangular cards are simply prepared, this does not make the user strongly conscious of features of the shapes of the figure plates and the triangular cards. Furthermore, handling properties are not good.

The present invention provides a figure plate set that helps the user to deepen the understanding of the geometric thinking thorough work and has excellent handling properties.

BRIEF SUMMARY OF THE INVENTION

The present invention discloses a figure plate set for learning, comprising: a plate member having a circular concave portion; and a group of figure plates that can form a regular polygon by being combined together, wherein the group of figure plates can be stored on the circular concave portion in a state that the regular polygon is formed and the regular polygon is inscribed in an inner peripheral wall of the circular concave portion. By the above configuration, the user can experientially understand the regular polygon through the work of combining the figure plates. Thus, ability of geometric thinking about regular polygon is increased. Since the circular concave portion is formed on the plate member, the inner peripheral wall of the circular concave portion corresponds to a circumscribed circle of the regular polygon formed by the figure plates. Furthermore, the circular concave portion also functions as a regulating surface for positioning the figure plates. Thus, the circular concave portion guides the user to place the figure plates. When the user combines the figure plates to form the regular polygon, the regular polygon is formed by positioning the figure plates so that apexes of the figure plates are inscribed in the inner peripheral wall of the concave portion. From the above, the figure plates can be combined easily and handling properties of the figure plates are improved.

In addition, through the work of forming the regular polygon by placing the figure plates on the concave portion so that the regular polygon are inscribed in the inner peripheral wall of the circular concave portion, the user becomes conscious of a relation between the regular polygon and the figure plates or a relation between the circumscribed circle of the regular polygon and the figure plates. Thus, the learning effect is improved. Furthermore, the regular polygon formed by the figure plates is rotatable along the inner peripheral wall of the concave portion. Therefore, when placing the figure plates, the user easily becomes conscious of forming the regular polygon inscribed in a circle. As a result, the user can experientially understand a relation between the circumscribed circle and the regular polygon. In addition, handling properties are also improved also in occasions other than the learning work. In other words, since the group of figure plates can be organized and maintained in an assembled state, if a storage case is added, for example, the figure plate set can be easily carried. In addition, since the concave portion has a circular shape, a clearance is formed between the sides of the placed figure plates and the inner peripheral wall of the concave portion. Because of the clearance, the user can easily remove the placed figure plates. Therefore, a concave portion made especially for removal is not required. Furthermore, since the concave portion has a circular shape, the group of figure plates can be stored on the concave portion without being restricted by the number of corners of the regular polygon formed by the group of figure plates.

In the figure plate set of the present invention, the following configurations are preferred. It is preferred that a plurality of groups of figure plates is provided, and the plurality of groups of figure plates can be stored in a stacked state on the circular concave portion. By the above configuration, the user can select the group of figure plates to be used as necessary. This can expand the range of learning. In addition, since the plurality of groups of figure plates are stored in a stacked state, the figure plate set is not increased in size and handling properties are not deteriorated significantly.

It is preferred that a point of contact of apexes of the group of figure plates is located at a center of the circular concave portion when the regular polygon is formed on the circular concave portion by combining the group of figure plates. By the above configuration, the figure plates can be combined based on the center of the circular concave portion. Therefore, the user can easily combine the figure plates. In addition, the user becomes conscious of combining the figure plates so that the circular concave portion becomes the center. Therefore, the user can easily remember the arrangement of the figure plates. Thus, the learning effect is improved.

It is preferred that the group of figure plates can form a regular dodecagon, and apexes of regular tetragonal figure plates and apexes of regular triangular figure plates are located at positions of apexes of the regular dodecagon formed by the group of figure plates. By the above configuration, the user can experientially understand that an inner angle of 150° of the regular dodecagon is a sum of an angle of 90° of an apex of a regular tetragon and an angle of 60° of an apex of a regular triangle. Thus, ability of geometric thinking about the regular dodecagon is increased.

It is preferred that the group of figure plates can form a regular dodecagon, and the group of figure plates includes a figure plate of an isosceles triangle having an apex angle of 150° and base angles of 15°. By the above configuration, although it is difficult for the user to understand the properties of the isosceles triangle having an apex angle of 150° and base angles of 15° only by the isosceles triangle itself, learning effect can be obtained by associating the isosceles triangle with the regular dodecagon and associating with the figures forming the regular dodecagon.

It is preferred that the group of figure plates can form a regular dodecagon, and the group of figure plates includes a figure plate of an isosceles triangle having an apex angle of 150° and base angles of 15°, a figure plate of an isosceles right triangle made by equally dividing the isosceles triangle into two, and a figure plate of a right triangle made by equally dividing a regular triangle into two. By the above configuration, different shapes can be formed by combining the figure plates. Therefore, the user can understand various aspects of properties of the isosceles triangle having an apex angle of 150° and base angles of 15°.

It is preferred that figure plates included in the group of figure plates are classified by color according to a shape. By the above configuration, the user can visually deepen the understanding. In addition, when combining the figure plates, the color and the angle can be considered in association with each other. Thus, the learning effect is improved.

By using the figure plate set of the present invention, the user can experientially deepen the understanding of geometric thinking thorough work and handling properties are good.

DETAILED DESCRIPTION OF THE INVENTION

Figure 1:
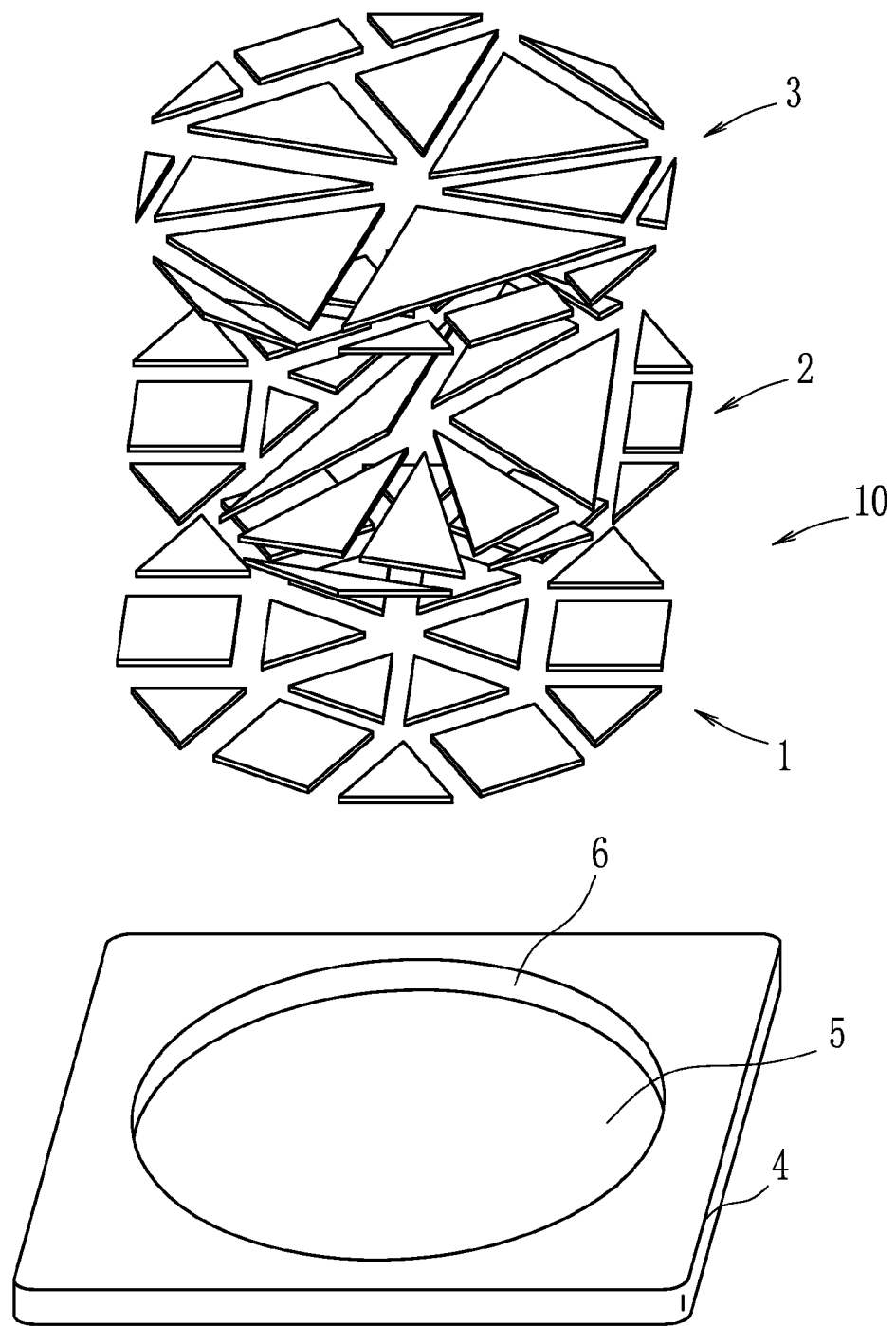
FIG. 1 is an exploded perspective view of a figure plate set concerning an embodiment of the present invention.

Hereafter, an embodiment of the present invention will be explained with reference to the drawings. FIG. 1 is an exploded perspective view of a figure plate set 10 concerning an embodiment of the present invention. The figure plate set 10 includes three groups of figure plates 1 to 3 and a plate member 4. Each of the groups of figure plates 1 to 3 is formed by a plurality of figure plates. A regular dodecagon can be formed by combining the plurality of figure plates included in any one of the groups of figure plates 1 to 3.

A circular concave portion 5 is formed on the plate member 4. The groups of figure plates 1 to 3 can be stored on the concave portion 5 in a state that apexes of the regular dodecagons formed by each of three groups of figure plates 1 to 3 are inscribed in an inner peripheral wall 6 of the concave portion 5. In this case, the groups of figure plates 1 to 3 are stored on the concave portion 5 in a stacked state in three layers.

Figure 2:
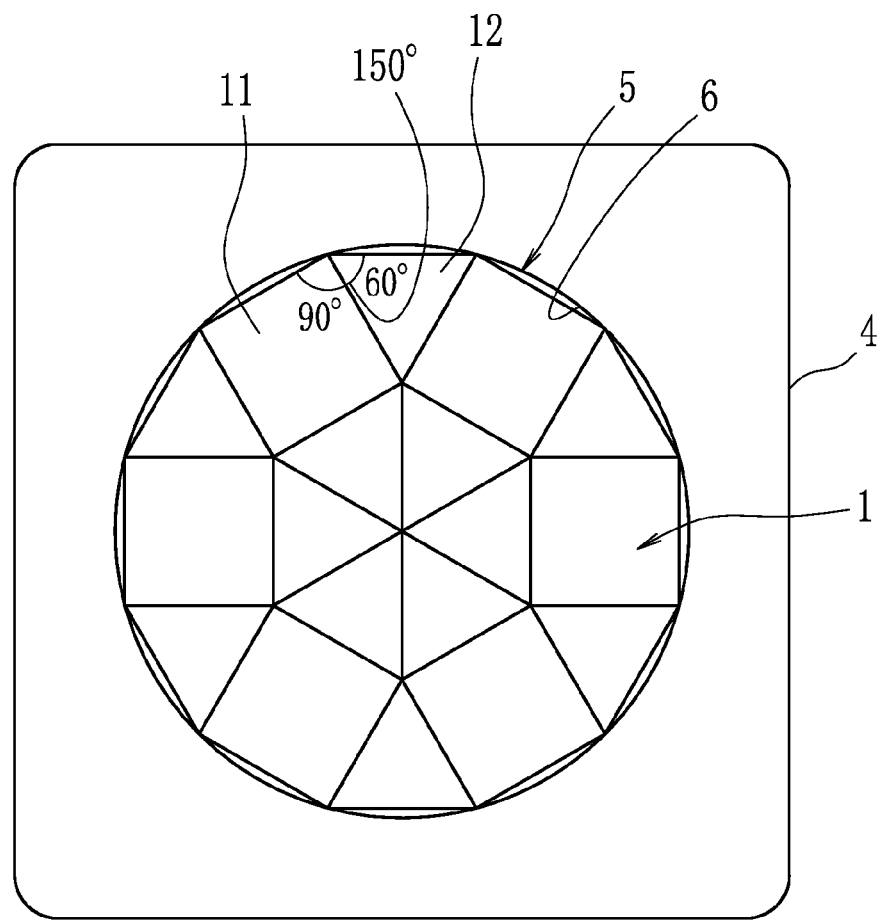
FIG. 2 is a plan view showing a state that a group of figure plates 1 of FIG. 1 is stored on a concave portion 5.

FIG. 2 is a plan view showing a state that the group of figure plates 1 is stored on the concave portion 5. In the group of figure plates 1, a regular dodecagon is formed by regular tetragonal figure plates 11 and regular triangular figure plates 12. Apexes of the regular tetragonal figure plates and apexes of the regular triangular figure plates are located at positions of apexes of the regular dodecagon. Therefore, an inner angle of 150° of the regular dodecagon is formed by an angle of the apex of 90° of the regular tetragonal figure plate 11 and an angle of the apex of 60° of the regular triangular figure plate 12.

In a state of FIG. 2, the apexes of the regular tetragonal figure plates 11 and the regular triangular figure plates 12 are in point-contact with the inner peripheral wall 6 of the concave portion 5. By the above configuration, the regular dodecagon is formed by placing the figure plates 11 and the figure plates 12 on the concave portion 5 so that the apexes of the figure plates 11 and the figure plates 12 are in contact with the inner peripheral wall 6 of the concave portion 5, which forms the circumscribed circle of the regular dodecagon.

Therefore, the inner peripheral wall 6 of the concave portion 5 is not merely the circumscribed circle of the regular dodecagon but also functions as a regulating surface for positioning the figure plates 11 and the figure plates 12. Thus, the concave portion 5 guides the user to place the figure plates. From the above, the regular dodecagon can be easily formed and handling properties of the figure plates when learning are improved. In addition, through the work of placing the figure plates, the user becomes conscious of a relation between the circumscribed circle of the regular dodecagon and the regular dodecagon and a relation between the regular dodecagon and the regular tetragon or the regular triangle forming the regular dodecagon. Thus, the learning effect can be obtained.

In FIG. 2, since the concave portion 5 has a circular shape, sides of the regular dodecagon formed by the group of figure plates 1 are not in contact with the inner peripheral wall 6 of the concave portion 5, and apexes are in contact with the inner peripheral wall 6 of the concave portion 5. In the concave portion 5, the position of the regular dodecagon formed by the figure plates 11, 12 is not completely fixed. Therefore, the regular dodecagon can be rotated along the inner peripheral wall 6 of the concave portion 5. From the above, when placing the figure plates 11 and the figure plates 12, the user easily becomes conscious of forming the regular dodecagon inscribed in a circle. As a result, the user can experientially understand a relation between the circumscribed circle and the regular dodecagon.

In other words, by using the figure plate set 10, the learning can be experientially done thorough the work of placing in addition to the visual learning effect. Thus, the learning effect is improved. If a plurality of groups of figure plates 1 to 3 is prepared as shown in the figure plate set 10 of FIG. 1, the learning effect can be obtained according to the shapes of the figure plates forming the group of figure plates. In the group of figure plates 1 shown in FIG. 2, through the work of placing the figure plates 11 and the figure plates 12, the user can experientially understand that the regular dodecagon is formed by the regular tetragons and the regular triangles. Thus, the user can experientially understand the arrangement of the regular tetragons and the regular triangles placed in the regular dodecagon. In addition, the user can experientially understand that an inner angle of 150° of the regular dodecagon is a sum of an angle of 90° of the apex of the regular tetragon and the angle of 60° of the apex of the regular triangle. Thus, ability of geometric thinking about regular dodecagon is increased. Furthermore, this can be also applied to examples of an exercise explained later.

In order to make learning efficiency using the figure plate set 10, a guide indicating a method of using the figure plate set 10 should be prepared in advance. Information useful for the leaning using the groups of figure plates 1 to 3 included in the figure plate set 10 should be written in the guide. For example, the shapes and angles of the figure plates included in the groups of figure plates 1 to 3 and a relation between the figure plates and the regular dodecagon can be written. Furthermore, although this will be explained later with reference to FIGS. 5 to 9, the learning effect obtained by combining the figure plates picked up from the groups of figure plates 1 to 3 can be written. If the above described guide is used simultaneously, the user can recognize that the figure plates included in the groups of figure plates 1 to 3 are the components of the regular dodecagon, and the user can increase the ability of geometric thinking about regular dodecagon.

On the other hand, since the concave portion 5 of the plate member 4 has a circular shape, handling properties are improved in occasions other than the learning work. Since the concave portion 5 has a circular shape, a clearance is formed between the sides of the placed figure plates 11, 12 and the inner peripheral wall of the concave portion 5. Because of the clearance, the user can easily remove the placed figure plates 11 and the figure plates 12. Therefore, a concave portion made especially for removal is not required.

Furthermore, when the groups of figure plates 1 to 3 are stored on the concave portion 5, the apexes of the regular dodecagons formed by the groups of figure plates 1 to 3 are positioned by the inner peripheral wall of the concave portion 5. Thus, the groups of figure plates 1 to 3 are maintained by the concave portion 5. Therefore, if a storage case is added, for example, the figure plate set 10 can be easily carried.

Figure 3:
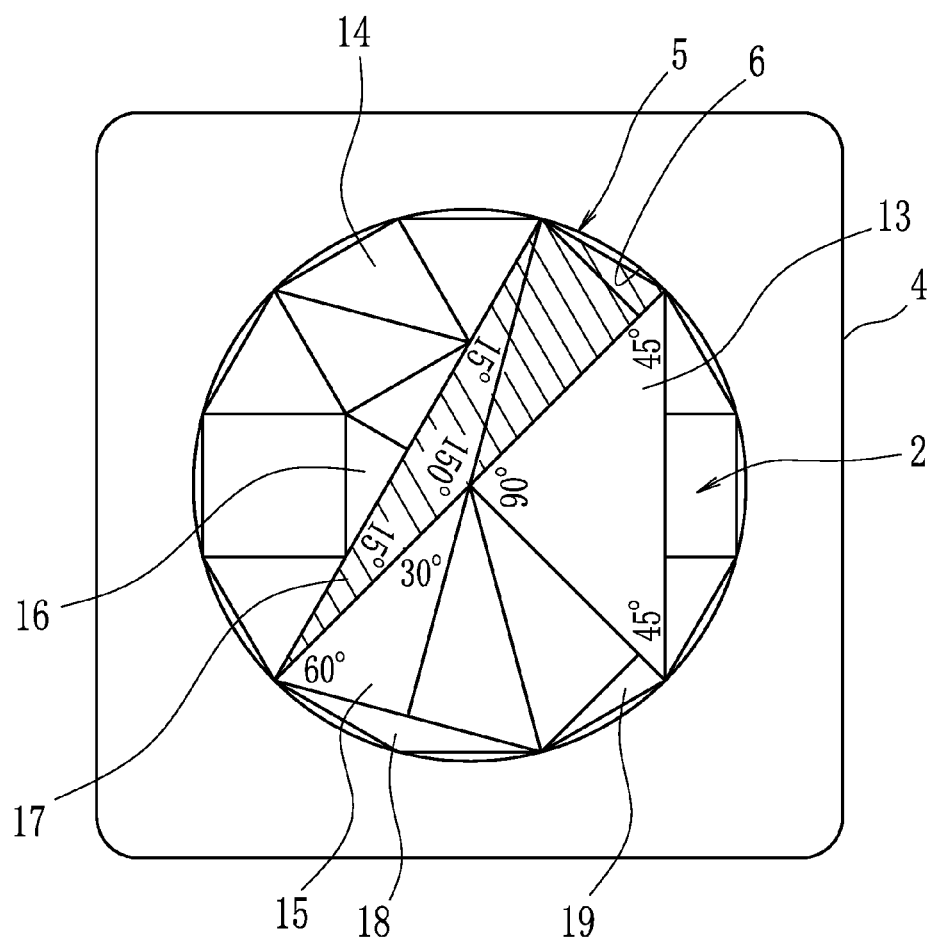
FIG. 3 is a plan view showing a state that a group of figure plates 2 of FIG. 1 is stored on the concave portion 5.

FIG. 3 is a plan view showing a state that the group of figure plates 2 is stored on the concave portion 5. In the group of figure plates 2, the variety of shapes and sizes of the figure plates is increased compared to the group of figure plates 1. The group of figure plates 2 includes figure plates 13, 14 of an isosceles right triangle, which is a half of a regular tetragon, and figure plates 15, 16 of a right triangle having angles of 60° and 30°, which is a half of a regular triangle. The group of figure plates 2 also includes isosceles triangles 17, 18 having an apex angle of 150° and base angles of 15° and a right triangle 19 having angles of 75° and 15°, which is obtained by equally dividing the isosceles triangles 17, 18 into two.

Figure 4:
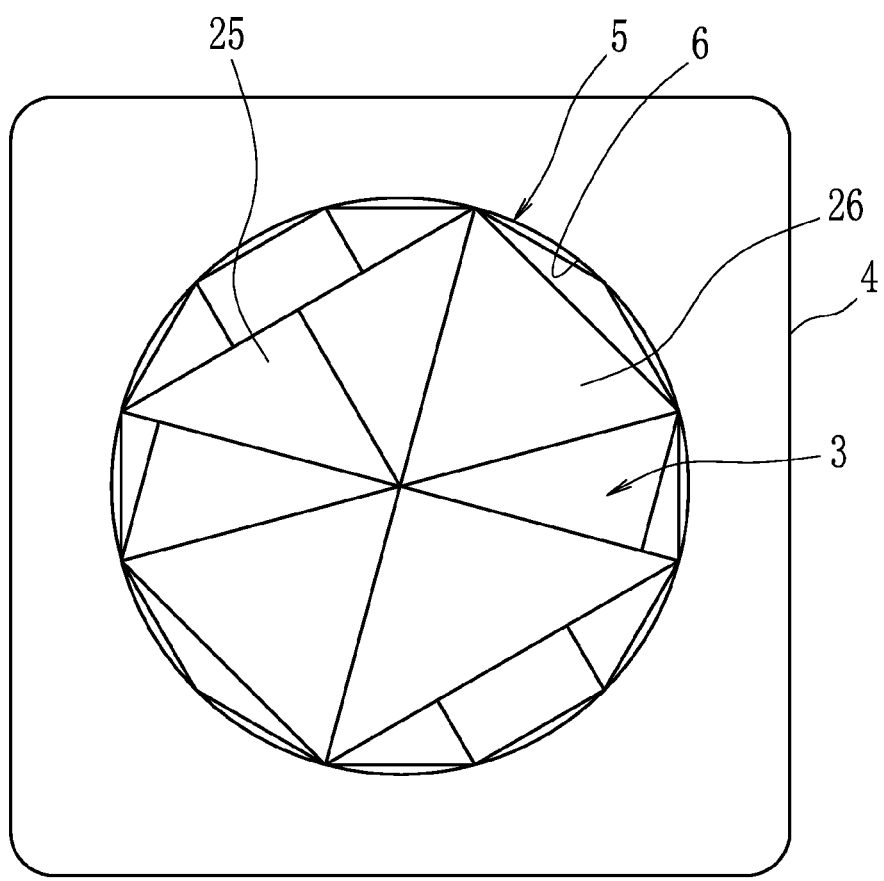
FIG. 4 is a plan view showing a state that a group of figure plates 3 of FIG. 1 is stored on the concave portion 5.

FIG. 4 is a plan view showing a state that the group of figure plates 3 is stored on the concave portion 5. Although the figure plates included in the group of figure plates 3 have similar shapes as the group of figure plates 2, sizes of the figure plates are different compared to the group of figure plates 2. Figure plates 25 are obtained by equally dividing the figure plates 13 of an isosceles right triangle shown in FIG. 3 into two. Figure plates 26 are regular triangular figure plates obtained by integrating two figure plates 15 of a right triangle shown in FIG. 3.

In the groups of figure plates 2 and 3, same as the group of figure plates 1, the regular dodecagon is formed by placing the figure plates on the concave portion 5 so that the apexes of the figure plates are in contact with the inner peripheral wall 6 of the concave portion 5. Through the work of placing the figure plates, the learning effect is improved. Since the groups of figure plates 2 and 3 include figure plates having different shapes compared to the group of figure plates 1, the ability of geometric thinking different from that of the group of figure plates 1 can be obtained.

In the groups of figure plates 1 to 3, a point of contact of apexes of the figure plates is located at a center of the circular concave portion 5 when the regular dodecagon is formed on the circular concave portion 5. By the above configuration, the figure plates can be combined based on the center of the circular concave portion 5. Therefore, the user can easily combine the figure plates. In addition, the user becomes conscious of combining the figure plates so that the circular concave portion 5 becomes the center. Therefore, the user can easily remember the arrangement of the figure plates. Thus, the learning effect is improved.

In the figure plate set 10, each of the groups of figure plates 1 to 3 can be independently used for leaning. Also, the figure plates can be arbitrarily selected from the groups of figure plates 1 to 3 and used for learning. In addition, all figure plates of each group can be simultaneously used for learning. Also, a part of figure plates of each group can be partly used for learning. Therefore, the learning effect can be obtained even when one of the groups of figure plates is used or even when a part of the figure plates is used. If the number of the groups of figure plates is increased, the variation of shapes and sizes of the figure plates can be increased. Thus, learning range is broadened. On the other hand, even when the number of the groups of figure plates is increased, the groups of figure plates 1 to 3 are stored in a stacked state as shown in FIG. 1. Therefore, the figure plate set is not increased in size and handling properties are not deteriorated significantly.

Figure 5:
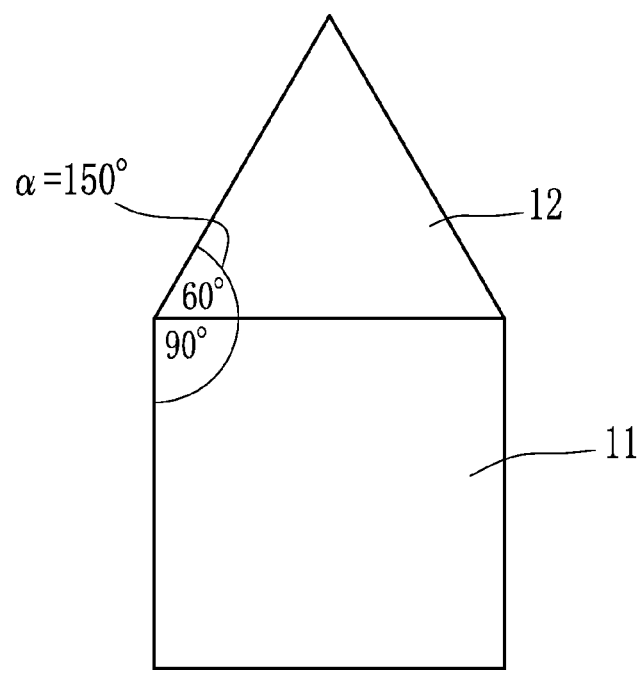
FIG. 5 is a plan view showing a state that figure plates are picked up from the group of figure plates 1 of FIG. 2 and the figure plates are combined.

Hereafter, the learning using the figure plates arbitrarily selected from the groups of figure plates 1 to 3 will be explained. FIG. 5 shows a state that one piece of the regular tetragonal figure plates 11 and one piece of the regular triangular figure plates 12 are picked up from the group of figure plates 1 of FIG. 2 and the figure plates are combined. Therefore, the user considers that the arrangement of FIG. 5 is a combination of the figure plate 11 and the figure plate 12, which are components of the regular dodecagon. Thus, the user can understand that an angle α is also the inner angle of 150° of the regular dodecagon. In other words, the user can associate the combination of FIG. 5 with the regular dodecagon. Through the work of combining the figure plates, the ability of geometric thinking is increased.

Figure 6:
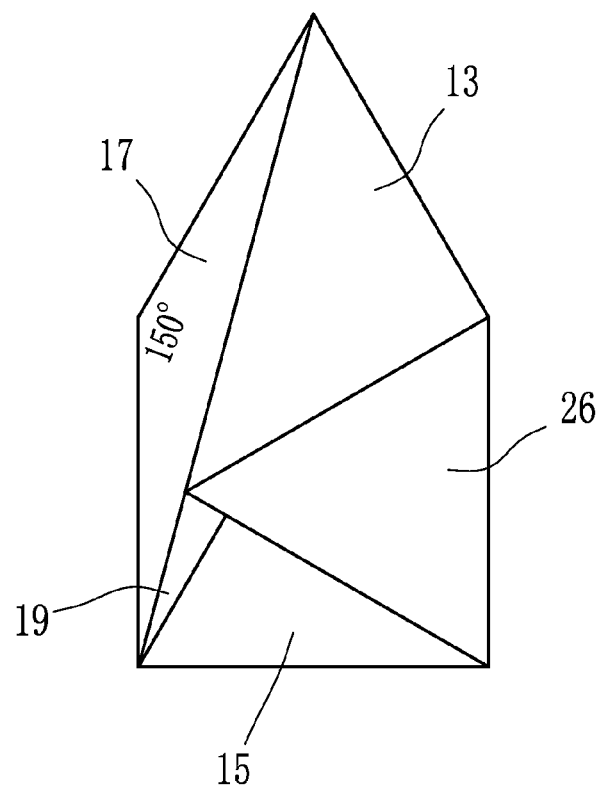
FIG. 6 is a plan view showing a state that figure plates are picked up from the group of figure plates 2 of FIG. 3 and the group of figure plates 3 of FIG. 4 and the figure plates are combined.

An outer shape of FIG. 6 is same as FIG. 5. FIG. 6 shows a state that the figure plates 13, 15, 17 and 19 of FIG. 3 and the figure plate 26 of FIG. 4 are picked up and combined. In the combination of FIG. 6, it is remarkable that the figure plates 17 of an isosceles triangle having an apex angle of 150° forms two sides of the outer shape of FIG. 6. In FIG. 3, the figure plate 17 and the figure plate 18 are similar to each other. The figure plate 18 forms two sides of the regular dodecagon. If the user understands this in advance, the user considers that the two sides of the outer shape of FIG. 6 are two sides of the regular dodecagon. Therefore, the user can also associate the combination of FIG. 6 with the regular dodecagon. Through the work of combining the figure plates, the ability of geometric thinking is increased.

Figure 7:
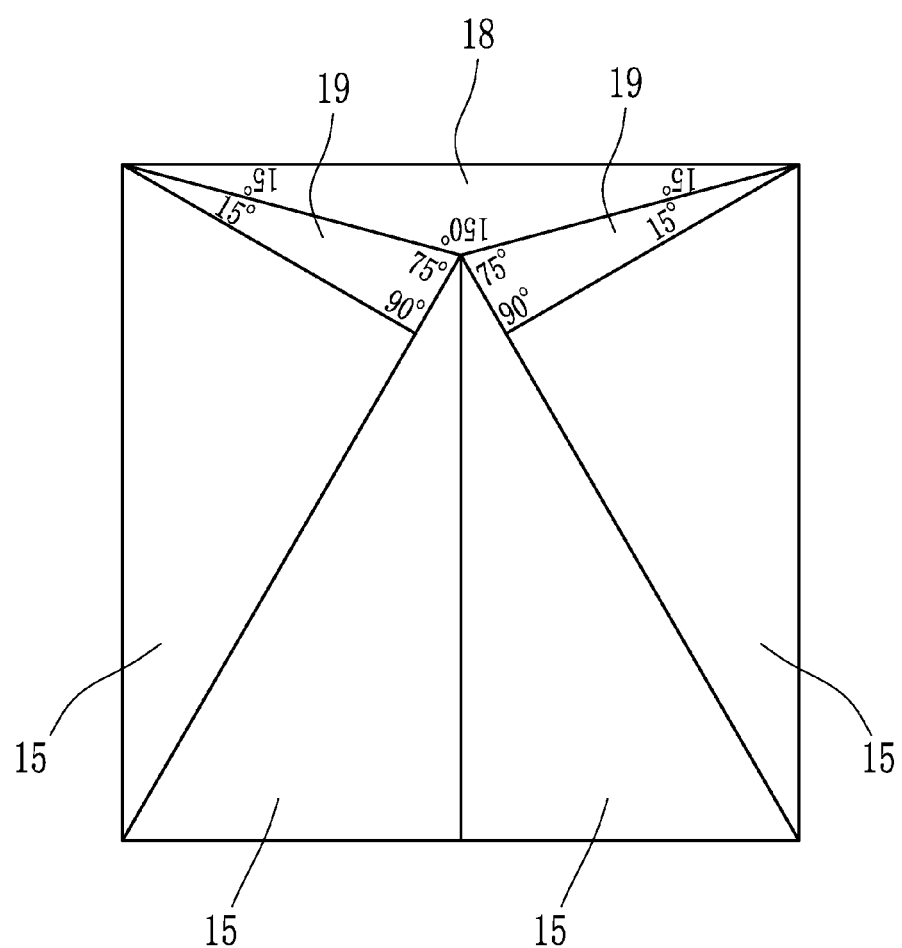
FIG. 7 is a plan view showing a state that figure plates are picked up from the group of figure plates 2 of FIG. 3 and the figure plates are combined to form a regular tetragon.
Figure 8:
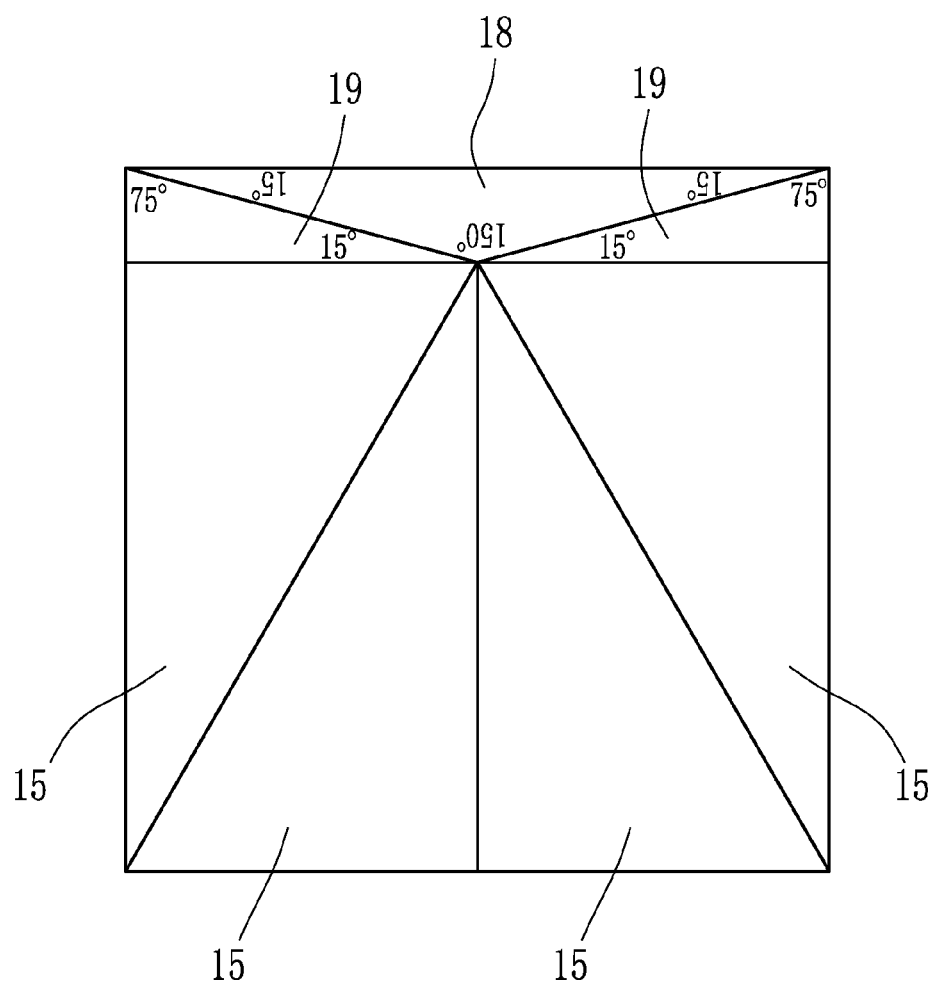
FIG. 8 is a plan view showing another example of the state that figure plates are picked up from the group of figure plates 2 of FIG. 3 and the figure plates are combined to form a regular tetragon.

FIG. 7 and FIG. 8 show a state that figure plates are picked up from the group of figure plates 2 of FIG. 3 and the figure plates are combined to form a regular tetragon. The shapes shown in FIG. 7 and FIG. 8 are formed by one piece of the figure plate 18, four pieces of the figure plates 15, and two pieces of the figure plates 19 of FIG. 3. Therefore, the figures inside the regular tetragon of FIG. 7 and FIG. 8 are also the figures forming the regular dodecagon. In FIG. 7 and FIG. 8, it is particularly remarkable that the regular tetragon includes the figure plate 18, which forms two sides of the regular dodecagon, and the figure plates 19, which is formed by equally dividing the figure plate 18 into two. In FIG. 7 and FIG. 8, one side of the regular tetragon is the base of the figure plates 18. The base of the figure plates 18 corresponds to one side of the regular hexagon inscribed in the regular dodecagon. If the user understands in advance that the figure plates 18 forms two sides of the regular dodecagon, the user can recognize the regular tetragon associating with the inner angle of 150° of the regular dodecagon when the regular tetragon is divided as shown in FIG. 7 and FIG. 8.

Figure 9:
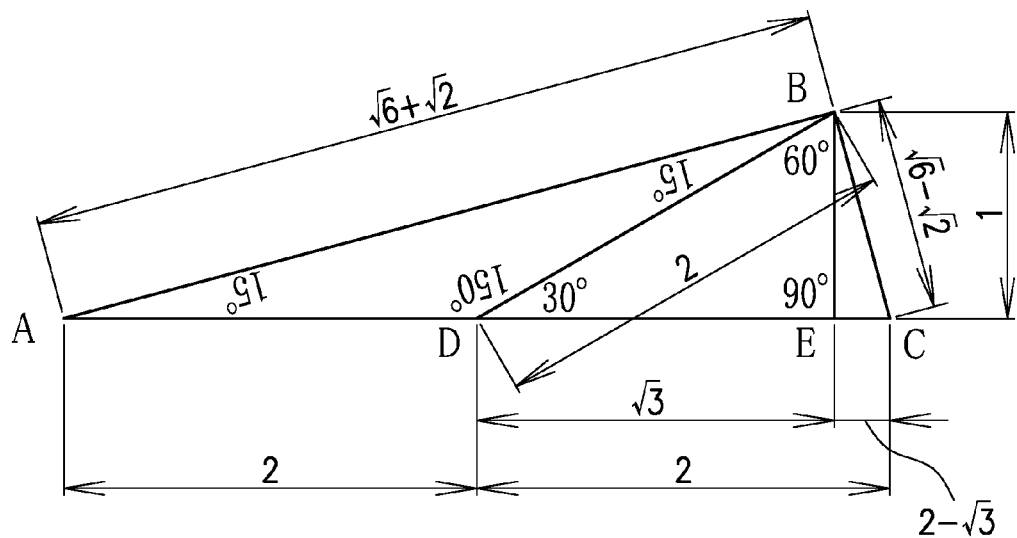
FIG. 9 is a diagram showing a state that three pieces of the group of figure plates 2 of FIG. 3 shown by shaded lines are picked up.

FIG. 9 shows a state that three pieces of the figure plates 2 of FIG. 3 shown by shaded lines are picked up as it is. If the user recognizes in advance that a triangle ABC of FIG. 9 is a part of the regular dodecagon of FIG. 3, the user can realize that a point D is a center of the circumscribed circle of the regular dodecagon. Therefore, the user can derive that a line DA, a line DB and a line DC are a radius of the circumscribed circle and have the same length. The length is 2 in FIG. 9. If the above is derived, since a triangle BDE is a right triangle having angles of 30° and 60°, lengths of a line BE and a line DE can be derived and a length of a line EC can be also derived as shown in the figure. Then, lengths of a line AB and a line BC can be derived from the Pythagorean theorem. From the process of derivations above, the user can understand that a sum of root 6 and root 2, which is used in trigonometrical function, corresponds to a length of the bottom of the isosceles triangle having an apex angle of 150°, which is a part of the regular dodecagon. Similarly, the user can understand that a difference between root 6 and root 2, which is used in trigonometrical function, corresponds to a length of one side of the regular dodecagon.

Therefore, same as the examples of FIGS. 5 and 6, the user can learn the figures associating the combination of FIGS. 7 to 9 with the regular dodecagon. Through the work of combining, the ability of geometric thinking is increased. In particular, in the combinations of FIGS. 7 to 9, same as the combination of FIG. 6, the user can learn the figures associating with the isosceles triangle having an apex angle of 150°. In addition, the combinations of the isosceles triangle having an apex angle of 150° and other figures are different in each of FIGS. 6 to 9. Therefore, through the work of combining, various aspects of learning effects can be obtained. Thus, ability of geometric thinking is increased.

Figure 10:
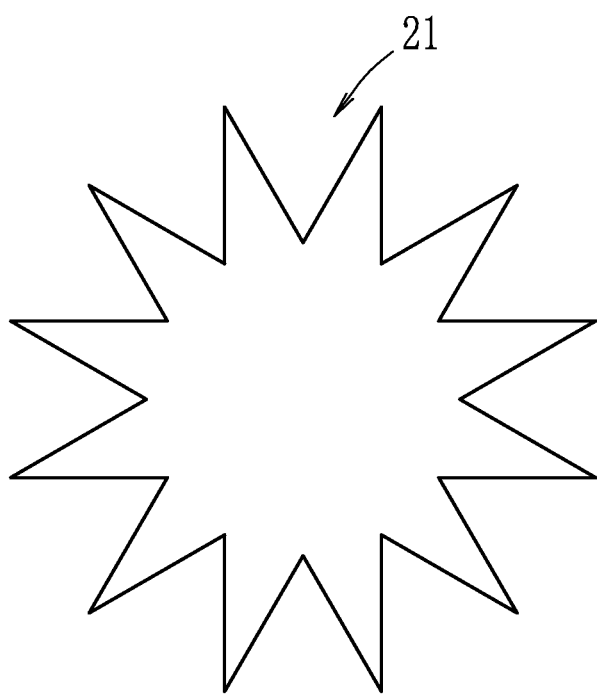
FIG. 10 is a diagram showing a first example of an exercise about figures.
Figure 11:
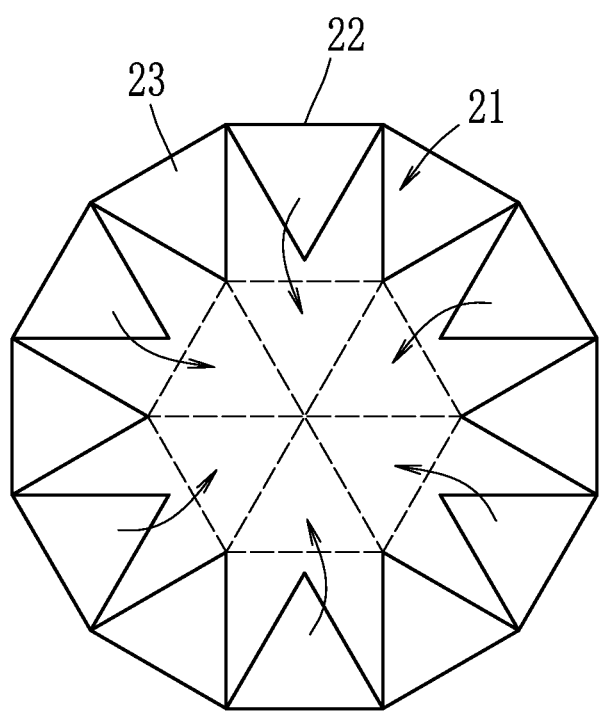
FIG. 11 is a diagram showing a process of the exercise shown in FIG. 10.
Figure 21:
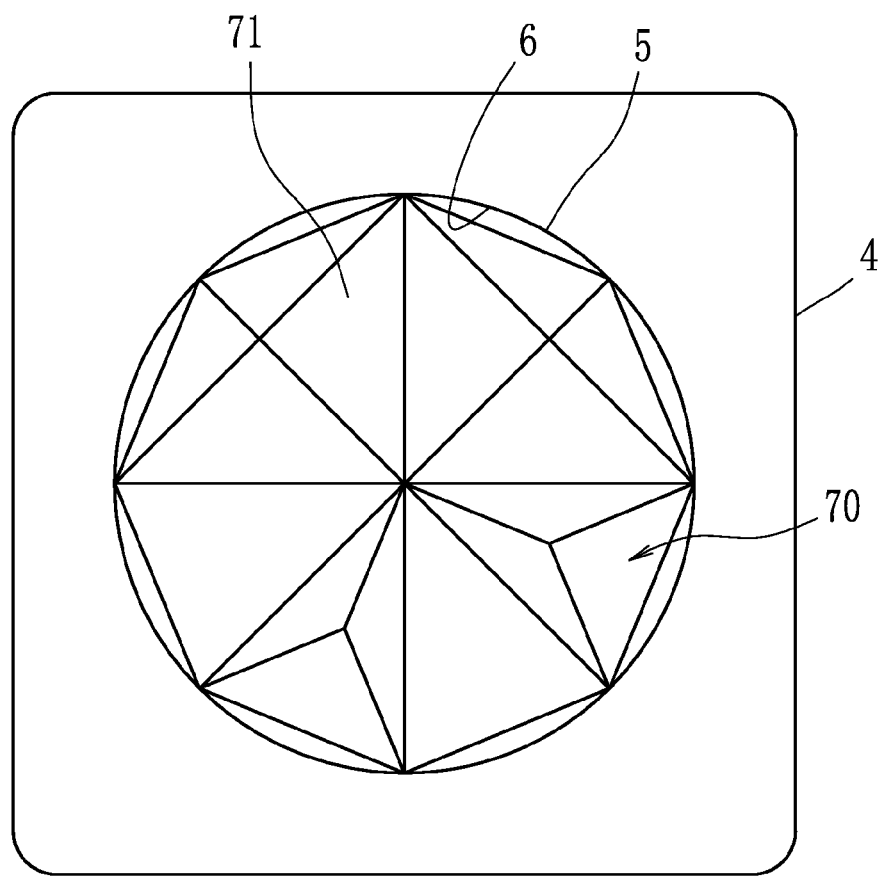
FIG. 21 is a plan view showing another example of a group of figure plates forming a regular octagon concerning an embodiment of the present invention.

Hereafter, examples of an exercise will be explained. In the examples, the ability of geometric thinking obtained by the figure plate set 10 can be used. FIG. 10 is a diagram showing the first example of an exercise. In FIG. 10, a FIG. 21 is drawn to calculate the area of the FIG. 21. Although the area of the FIG. 21 cannot be directly calculated, the area can be calculated by using the ability of geometric thinking obtained by the figure plate set 10. In FIG. 11, a line 22 is added to connect the apexes of the FIG. 21 of FIG. 10.

When FIG. 10 and FIG. 11 are compared, the user can understand that the area of the FIG. 21 can be calculated by subtracting twelve times of the area of a regular triangle 23 from the regular dodecagon of FIG. 11. On the other hand, from the learning using the group of figure plates 1 shown in FIG. 2, the user can learn that the regular dodecagon can be divided into the regular tetragons and the regular triangles. Therefore, if the ability of geometric thinking about the regular dodecagon is obtained from the learning using the group of figure plates 1 shown in FIG. 2, the user becomes conscious of dividing the regular dodecagon into the regular tetragon and the regular triangle in FIG. 11. Specifically, if the regular triangles 23 located on an outer periphery are alternately moved toward the center (in arrow direction) to positions indicated by broken lines, the figure is formed by the regular tetragons and the regular triangles same as FIG. 2. Then, the area of the regular dodecagon can be calculated by a sum of the regular triangles and the regular tetragons. And then, the area of the FIG. 21 can be calculated by subtracting twelve times of the area of the regular triangle 23 from that.

Figure 12:
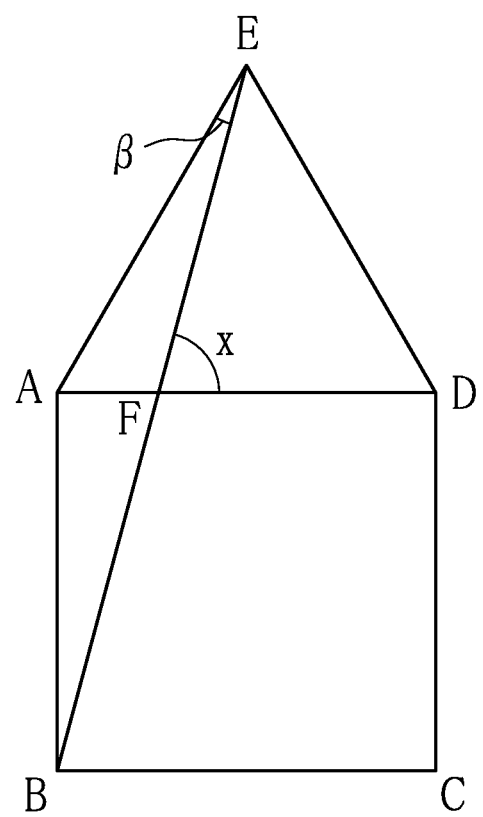
FIG. 12 is a diagram showing a second example of an exercise about figures.

FIG. 12 is a diagram showing the second example of an exercise. The figure shows an example of an exercise of calculating an angle x of a point F in a figure formed by combining a regular tetragon ABCD and a regular triangle EAD. Through the learning of combining the figure plates shown in FIG. 6, the user can derive that the angle of the point A is an inner angle of 150° of the regular dodecagon and a triangle ABE is an isosceles triangle including two sides of the regular dodecagon. From the above, the user can understand that an angle β is 15° and the angle x is 75°, which is a sum of the angle of 60° of the regular triangle EAD and the angle of 15° (angle β). In other words, the ability of geometric thinking obtained by the figure plate set 10 is useful for solving this exercise.

Figure 13:
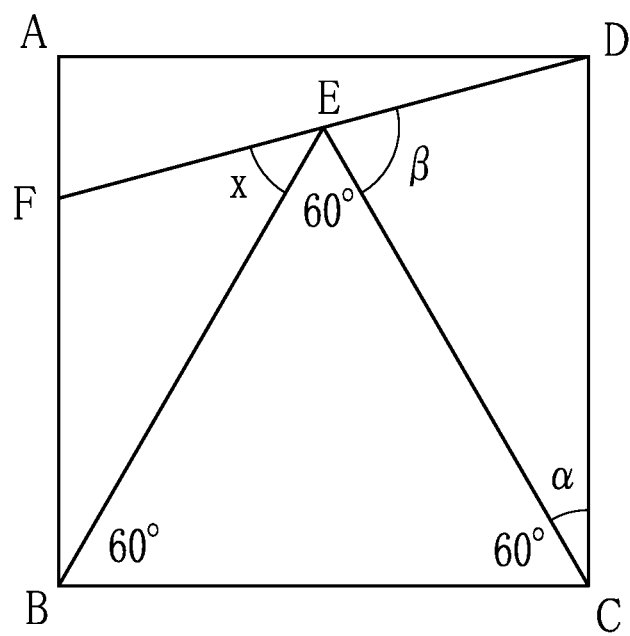
FIG. 13 is a diagram showing a third example of an exercise about figures.

FIG. 13 is a diagram showing the third example of an exercise. The figure shows an example of an exercise of calculating an angle x of a point E in a figure including a regular triangle EBC in the regular tetragon ABCD. Through the learning of combining the figure plates shown in FIGS. 7 and 8, the user can understand that a triangle CDE is an isosceles triangle. Then, the user can derive that an angle α is 30° and an angle β is 75°. And then, the angle x can be derived. The ability of geometric thinking obtained by the figure plate set 10 is also useful for solving this exercise.

Figure 14:
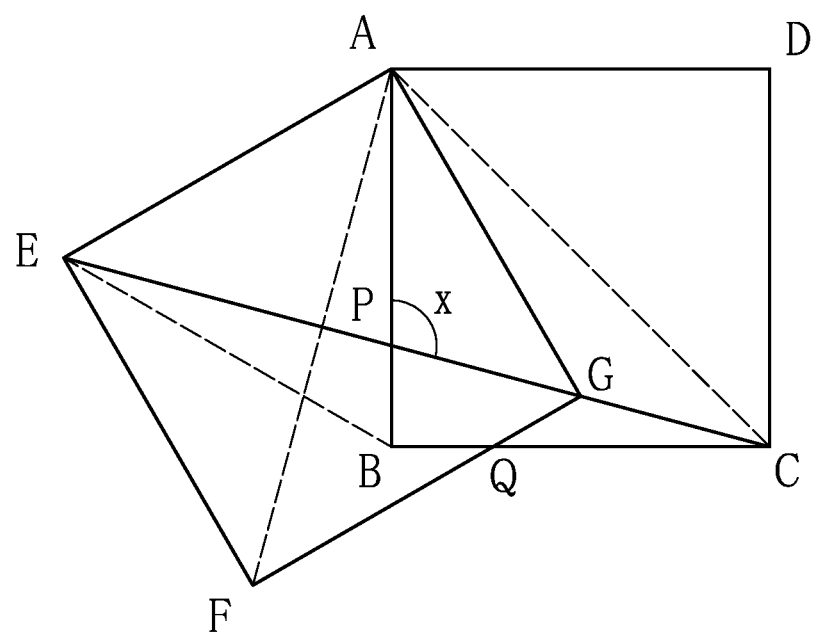
FIG. 14 is a diagram showing a fourth example of an exercise about figures.

FIG. 14 is a diagram showing the fourth example of an exercise. The figure shows an example of an exercise of calculating an angle x of a point P in a figure including the regular tetragon ABCD and a regular tetragon EFGA, which is formed by rotating the regular tetragon ABCD around a point A. This example of an exercise can be solved by drawing an auxiliary line AC and an auxiliary line AF. Through the learning of combining the figure plates shown in FIG. 6, the user becomes conscious of drawing an auxiliary line BE. If the auxiliary line BE is drawn, the user can guess that a triangle BEC is an isosceles triangle having an apex angle of 150°. Based on the guess above, angles around the point P including the angle x can be guessed. As described before, although the angle x cannot be actually solved without drawing the auxiliary line AC and the auxiliary line AF in the example of an exercise, a value of the angle guessed by drawing the auxiliary line BE is also correct. Therefore, if various aspects of the isosceles triangle having an apex angle of 150° are understood by using the figure plate set 10, the user can try the solution by focusing on the isosceles triangle having an apex angle of 150° as described above. Such a trial can increase the ability of geometric thinking.

In the above examples, the figure plate set 10 includes three groups of figure plates 1 to 3 and each of the figure plates forms the regular dodecagon. However, the group of figure plates can be one group or a plurality of groups. A shape formed by the group of figure plates is not limited to the regular dodecagon, as long as it is a regular polygon. The group of figure plates can be formed by mixing different kinds of regular polygons having different number of corners. In other words, even if the group of figure plates is one group, the learning effect is improved by placing the figure plates on the concave portion 5 to form the regular polygon. In addition, the figure plates forming the group of figure plates can be specified according to the number of corners. Thus, the ability of geometric thinking can be obtained according to the number of corners.

Figure 15:
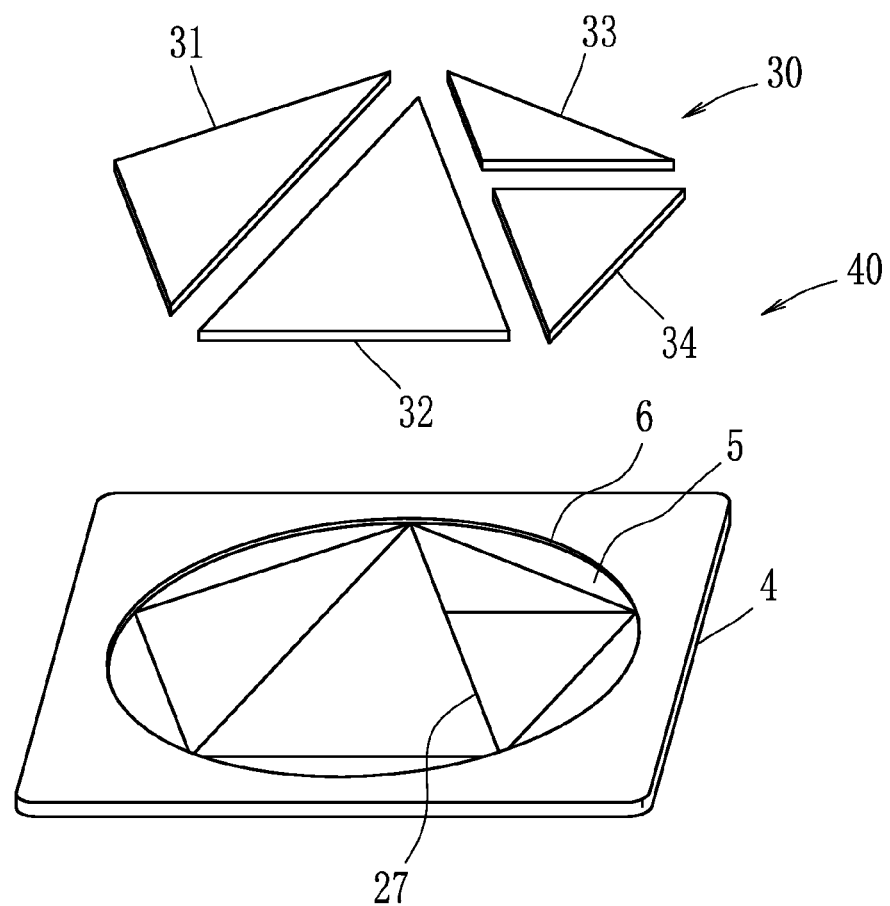
FIG. 15 is an exploded perspective view of a figure plate set concerning another embodiment of the present invention.

FIG. 15 is an exploded perspective view of a figure plate set 40 concerning another embodiment of the present invention. The figure plate set 40 includes a group of figure plates 30 and a plate member 4. The group of figure plates 30 is formed by four figure plates 31 to 34. A regular pentagon can be formed by combining the figure plates 31 to 34. In addition, the group of figure plates 30 can be stored on the concave portion 5 so that apexes of the regular pentagon formed by the group of figure plates 30 are inscribed in the inner peripheral wall 6 of the concave portion 5 of the plate member 4. By using the figure plate set 40, the ability of geometric thinking about the regular pentagon can be increased. This will be explained with reference to FIG. 16.

Figure 16:
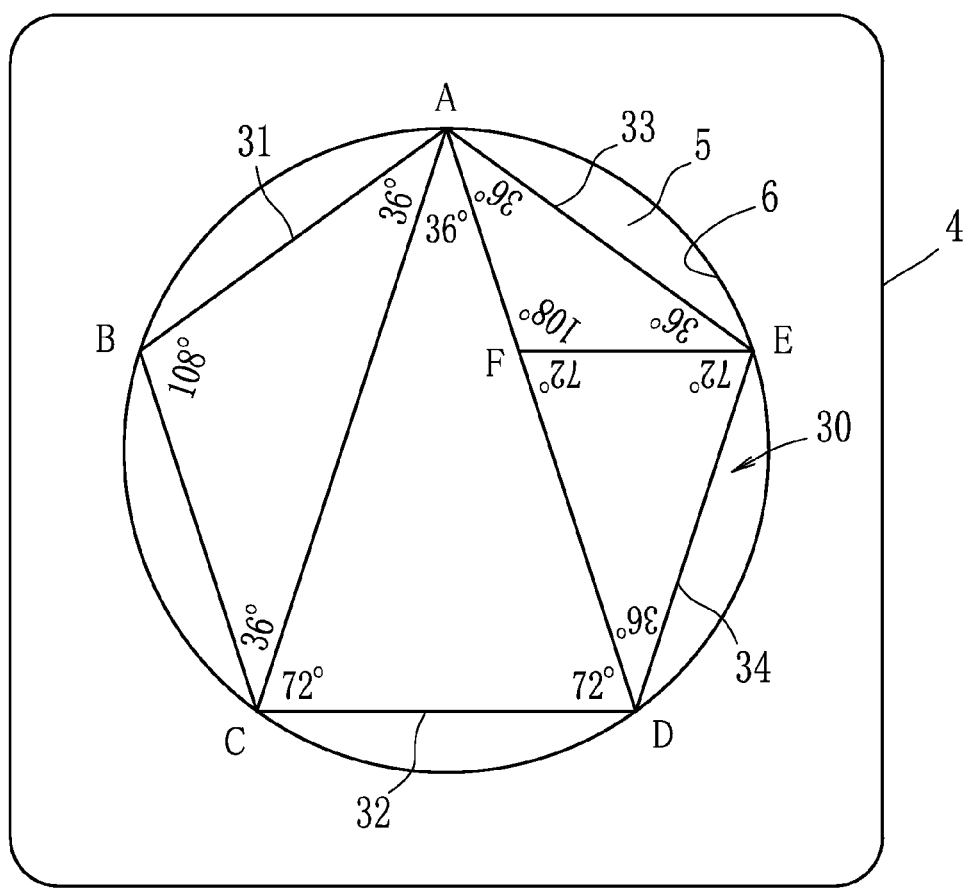
FIG. 16 is a plan view showing a state that a group of figure plates 30 of FIG. 15 is placed on the plate member.

FIG. 16 is a plan view showing a state that the group of figure plates 30 is placed on the plate member 4. From the figure, it can be understood that the regular pentagon can be divided into two kinds of isosceles triangles: one is an isosceles triangle BCA and an isosceles triangle EAD having an apex angle of 108° and base angles of 36°, and the other is an isosceles triangle ACD having an apex angle of 36° and base angles of 72°. The isosceles triangle EAD can be divided into two isosceles triangles: one is an isosceles triangle FEA having an apex angle of 108° and base angles of 36°, and the other is an isosceles triangle DEF having an apex angle of 36° and base angles of 72°. The isosceles triangle FEA, which is one of the triangles obtained by being divided, has a similar shape as the isosceles triangle EAD, which is a triangle before divided. The isosceles triangle DEF, which is the other of the triangles obtained by being divided, has a similar shape as the isosceles triangle ACD.

From the above, the regular pentagon can be regarded as an assembly of two kinds of isosceles triangles: one is the isosceles triangles having an apex angle of 108° and base angles of 36°, the other is the isosceles triangles having an apex angle of 36° and base angles of 72°. By being divided further, the isosceles triangle having a congruent shape or a similar shape as the isosceles triangle shown in FIG. 16 can be added. In addition, the user can realize that an inner angle of 108° is formed by a sum of three 36° at some apexes, and the inner angle of 108° is formed by a sum of 36° and 72° at the other apexes.

Therefore, the user can realize that the regular pentagon is geometrically related to two kinds of isosceles triangles: one is an isosceles triangle having an apex angle of 108° and base angles of 36°, and the other is an isosceles triangle having an apex angle of 36° and base angles of 72°. From the above, the user can combine the figure plates 31 to 34 forming the group of figure plates 30 and experientially deepen the understanding of the figure of the regular pentagon. Thus, the ability of geometric thinking related to the regular pentagon can be increased.

Figure 17:
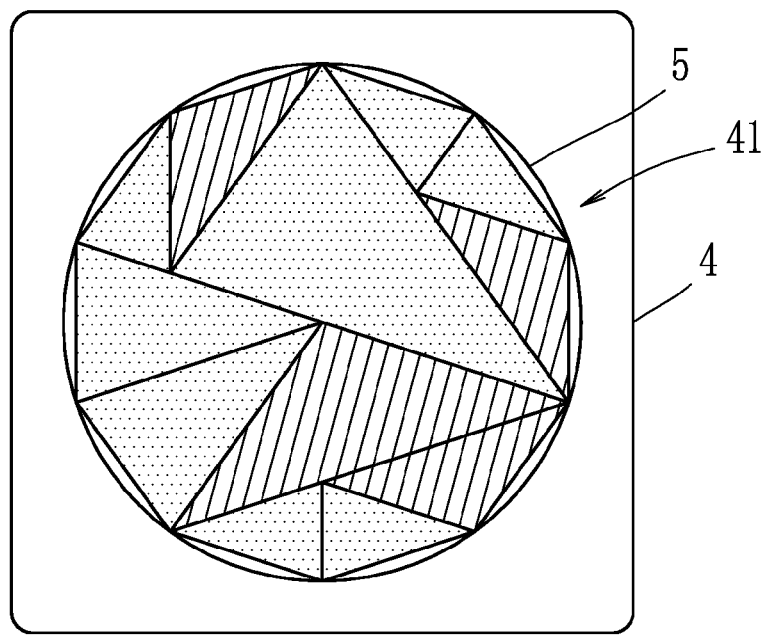
FIG. 17 is a plan view showing a group of figure plates forming a regular decagon concerning an embodiment of the present invention.

FIG. 17 is a plan view showing a group of figure plates forming a regular decagon. A group of figure plates 41 is formed by twelve triangular figure plates. The figure plates are formed of two kinds of figure plates: one is figure plates (shaded parts), which has a similar shape as the figure plate 31 of FIG. 16, the other is figure plates (dotted part), which has a similar shape as the figure plate 32 of FIG. 16. Since the group of figure plates 41 includes the figure plates forming the regular decagon, the user can experientially deepen the understanding of the figure of the regular decagon by using the group of figure plates 41. Thus, the ability of geometric thinking related to the regular decagon can be increased. In addition, since the number of the figure plates is increased, the range of learning using the figure plate set can be expanded.

The user can easily imagine that the regular decagon is formed by using ten figure plates of the isosceles triangle, which is formed by using one side of the regular decagon as a base and the center of the regular decagon as an apex. However, the user can hardly imagine that the regular decagon is formed by combining the similar triangles of figure plates 31 and the figure plates 32. By using the figure plate set shown in FIG. 17, the user can experientially understand that the angles of 72°, 108° and 144° are included inside the regular decagon. Here, the angles of 72°, 108° and 144° are multiples of the angle of 36°. Furthermore, the user can experientially understand that the multiples of the angle are formed by combining the similar triangles of the figure plates 31 and the figure plates 32.

Figure 18:
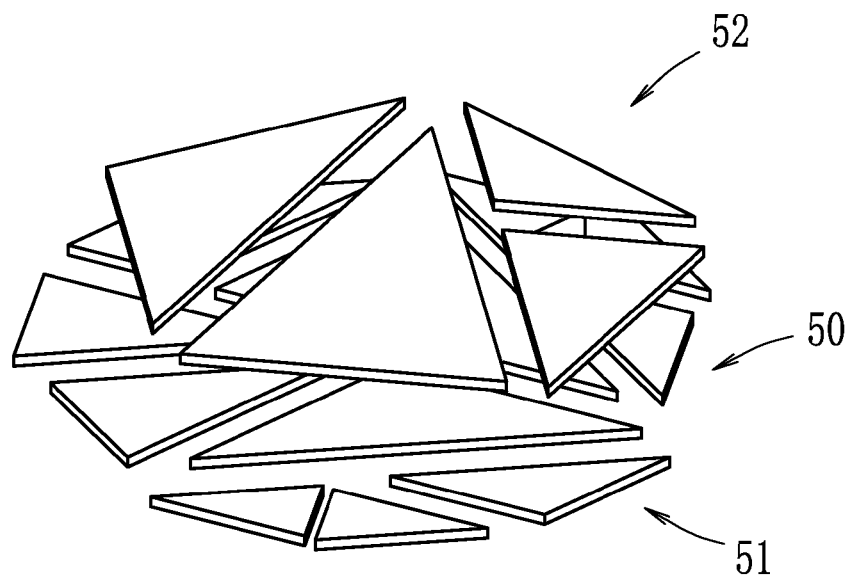
FIG. 18 is an exploded perspective view of a figure plate set concerning another embodiment of the present invention.
Figure 18:
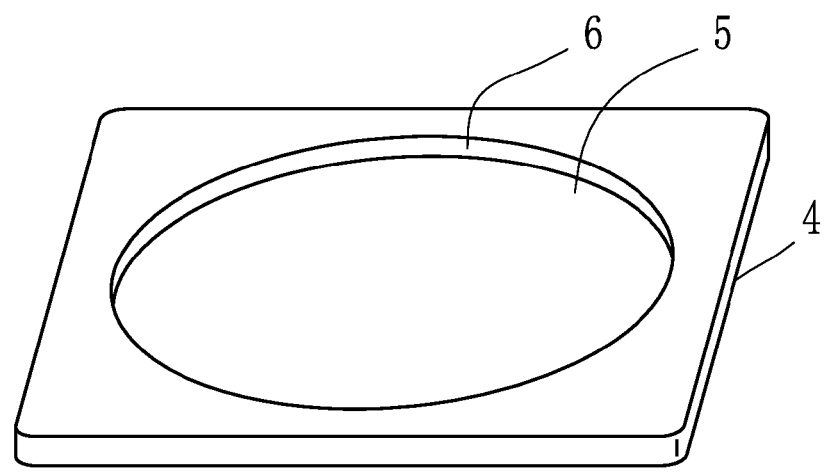

FIG. 18 shows the third example of the figure plate set. A figure plate set 50 shown in the figure includes both a group of figure plates 52 and a group of figure plates 51. The group of figure plates 52 can form the regular pentagon. The group of figure plates 51 can form the regular decagon. By the above configuration, the group of figure plates to be used can be selected as necessary. This can expand the range of learning. The group of figure plates 51 and the group of figure plates 52 can be placed on the plate member 4 in two layers. Therefore, same as the configuration shown in FIG. 1, the figure plate set 50 can be kept in an assembled state. Therefore, if a storage case is added, the figure plate set 50 can be easily carried.

Figure 19:
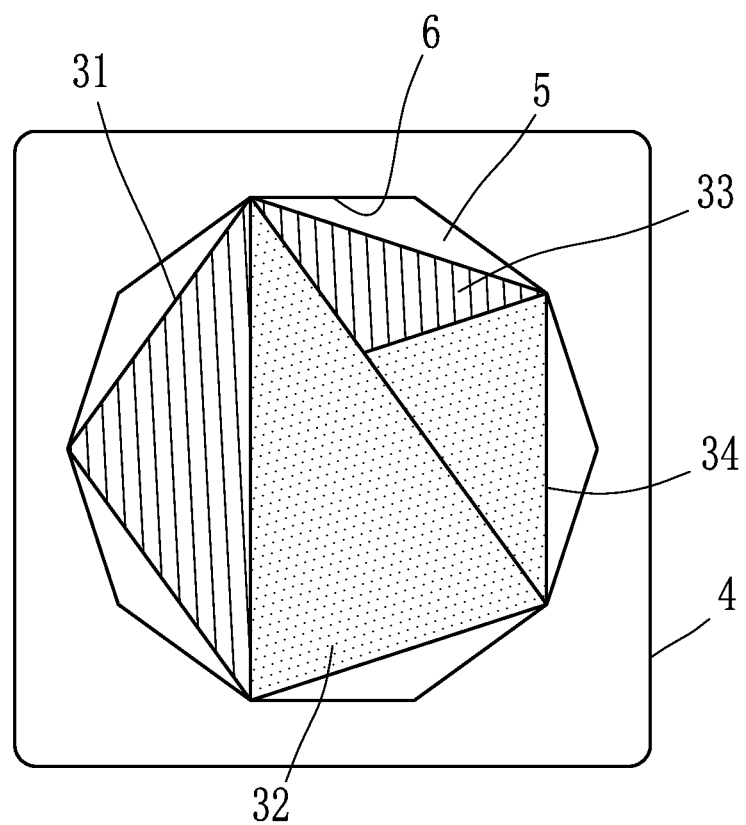
FIG. 19 is a plan view showing a state that the concave portion is formed as a regular decagon concerning an embodiment of the present invention.

In the above described embodiment, the inner peripheral wall 6 of the concave portion 5 of the plate member 4 has the circular shape. However, the shape is not limited to the circular shape. If the inner peripheral wall 6 of the concave portion 5 has a shape of the regular decagon, in addition to the combined plate having a shape of the regular decagon, the combined plate having a shape of the regular pentagon can be placed along the inner peripheral wall 6 of the concave portion 5. FIG. 19 is a plan view showing a state that the inner peripheral wall 6 of the concave portion 5 is formed as a regular decagon. In FIG. 19, the inner peripheral wall 6 of the concave portion 5 shown in FIG. 16 is formed as a regular decagon. As shown in the figure, the apexes of the regular pentagon formed by the figure plates 31 to 34 are in contact with the inner peripheral wall 6 of the concave portion 5 of the regular decagon.

By the above configuration, the regular pentagon is formed by placing the figure plates 31 to 34 on the concave portion 5 so that the apexes of the figure plates 31 to 34 are in contact with the inner peripheral wall 6 of the concave portion 5 of the regular decagon. Therefore, the user can recognize a relation between the regular decagon and the regular pentagon inscribed in the regular decagon through the above described placement work. Thus, the learning effect is improved.

The inner peripheral wall 6 of the concave portion 5 has a shape of the regular decagon and the combined plates placed on the concave portion 5 have a shape of the regular pentagon. Therefore, a clearance is formed between the sides of the placed figure plates 31 to 34 and the inner peripheral wall 6 of the concave portion 5. Because of the clearance, the user can easily remove the placed figure plates 31 to 34. Therefore, a concave portion made especially for removal is not required. Furthermore, the combined plates having a shape of the regular decagon and the combined plates having a shape of the regular pentagon can be placed on the inner peripheral wall 6 of the concave portion 5 of the regular decagon in two layers. In other words, even if the shape of the inner peripheral wall 6 of the concave portion 5 is changed to the regular decagon as shown in FIG. 19, the group of figure plates 51 (FIG. 18) formed in a shape of the regular decagon and the group of figure plates 52 (FIG. 18) formed in a shape of the regular pentagon can be placed on the concave portion 5 in two layers.

Figure 20:
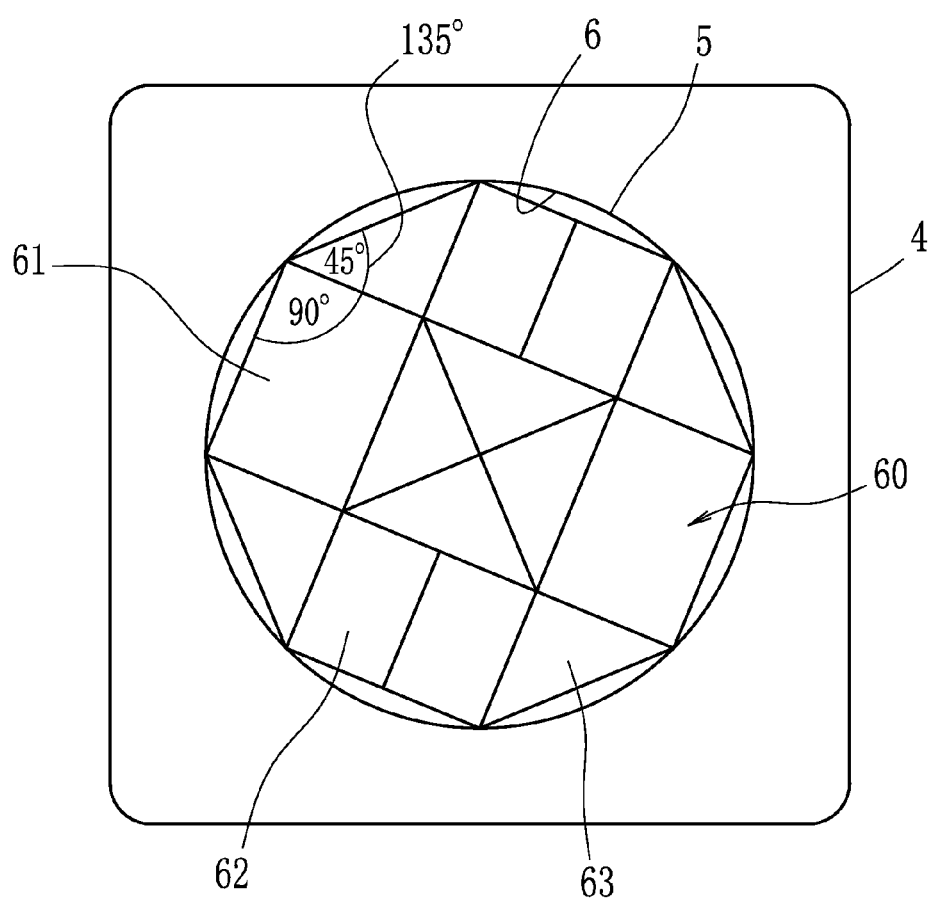
FIG. 20 is a plan view showing a group of figure plates forming a regular octagon concerning an embodiment of the present invention.
Figure 22:
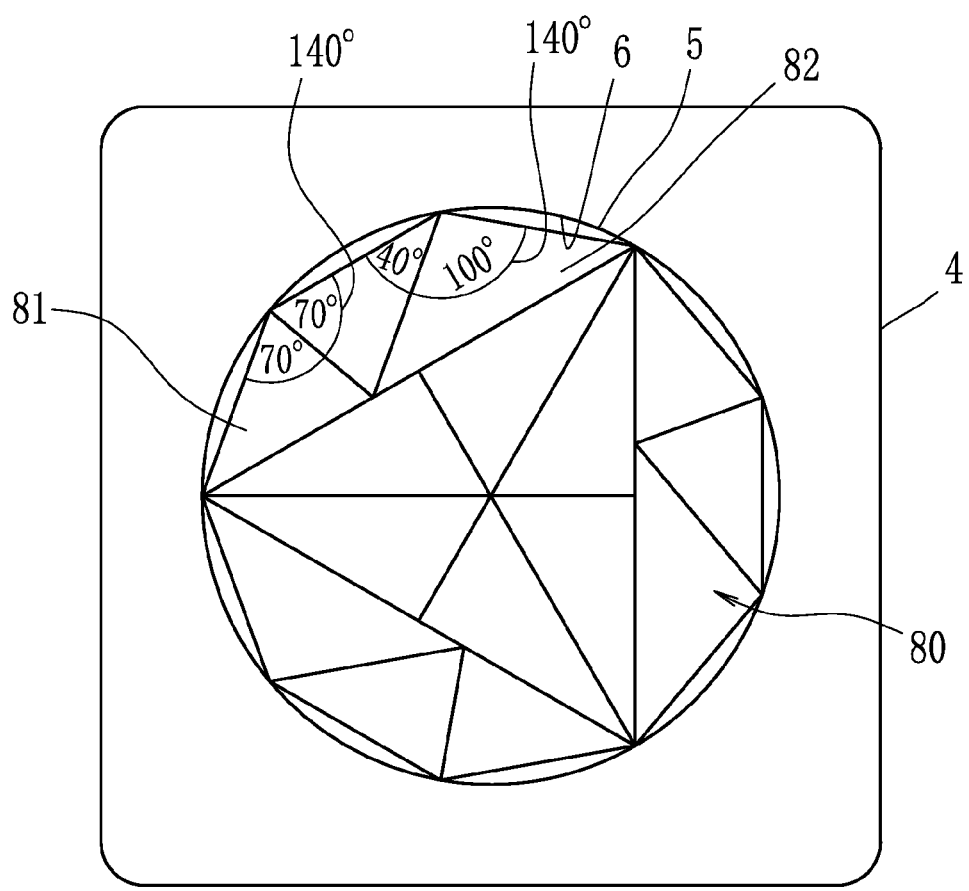
FIG. 22 is a plan view showing a group of figure plates forming a regular nonagon concerning an embodiment of the present invention.

FIGS. 20 to 22 are plan views showing other examples of the group of figure plates. The group of figure plates shown in FIG. 20 includes figure plates 61 and 62 of a rectangular shape and figure plates 63 of an isosceles right triangle. A regular octagon can be formed by combining all of the figure plates. The apexes of the regular octagon are in point-contact with the inner peripheral wall 6 of the concave portion 5. A group of figure plates 70 shown in FIG. 21 includes figure plates 70 and 71 of an isosceles right triangle. A regular octagon can be formed by combining all of the figure plates. The apexes of the regular octagon are in point-contact with the inner peripheral wall 6 of the concave portion 5. The group of figure plates shown in FIG. 22 includes figure plates that can form a regular nonagon by combination. The apexes of the regular nonagon are in point-contact with the inner peripheral wall 6 of the concave portion 5.

Same as the learning of combining the groups of figure plates 1 to 3 or the like, the user can learn the figures associating the group of figure plates shown in FIGS. 20 to 22 with the regular octagon or the regular nonagon. Through the work of combining the figure plates, the ability of geometric thinking is increased. In particular, in the example shown in FIG. 20, it is remarkable that the figure plates 61 and 62 having a rectangular shape are provided. An aspect ratio of the figure plates 61 and 62 having a rectangular shape is 1:root 2. This ratio is same as the aspect ratio of A-sized and B-sized paper. By the above configuration, the user can associate the regular octagon with the paper sizes that are daily used. Thus, various aspects of learning effects can be obtained.

FIGS. 20, 21 and 22 illustrate the groups of figure plates 60, 70 and 80 respectively. Although the figure plate set can be formed only by one of the groups of figure plates selected from them, the figure plate set can be also formed by any two groups of figure plates or all three groups of figure plates. Other groups of figure plates can be added in addition to the above described groups of figure plates. When a plurality of groups of figure plates is used, the groups of figure plates are stored on the concave portion 5 in a stacked state.

Various embodiments of the figure plate set are explained above. The figure plates forming the figure plate set can be classified by color so that the figure plates can be distinguished with each other. By the above configuration, the user can visually deepen the understanding. In addition, when the figure plates are combined, the color and the angle can be considered in association with each other. Thus, the learning effect is improved.

Only the figure plates are fitted into the plate member 4 in the configuration having the plate member 4 shown in FIG. 1 or other figures. However, a protractor, a straight plate, a compass or other tools can be fitted into the plate member 4 at a position avoiding the figure plates. Materials of the figure plates are not particularly limited. Resin materials and paper materials can be used, for example.

In the illustration of FIG. 3 and other figures, angles are indicated on a part of the figure plates for the convenience of the explanation. The angles can be actually indicated on the figure plates to improve the learning effect. Instead of the angles, marks or symbols such as a round mark can be indicated. When indicating the round mark or other marks, the angles can be visually judged easily by changing the number of the round marks according to the angle. Even if the angles are not indicated, the user can recognize the angles and learn the figures by simultaneously using the above described guide.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the sprit and scope of the invention as defined in the appended claims.

What is claimed is:

1. A figure plate set for learning, comprising:
a plate member having a circular concave portion; and
a group of figure plates that can form a regular polygon by being combined together, wherein
the group of figure plates can be stored on the circular concave portion in a state that the regular polygon is formed and the regular polygon is inscribed in an inner peripheral wall of the circular concave portion.

2. The figure plate set according to claim 1, wherein
a plurality of groups of figure plates is provided, and
the plurality of groups of figure plates can be stored in a stacked state on the circular concave portion.

3. The figure plate set according to claim 1, wherein
a point of contact of apexes of the group of figure plates is located at a center of the circular concave portion when the regular polygon is formed on the circular concave portion by combining the group of figure plates.

4. The figure plate set according to claim 1, wherein
the group of figure plates can form a regular dodecagon, and
apexes of regular tetragonal figure plates and apexes of regular triangular figure plates are located at positions of apexes of the regular dodecagon formed by the group of figure plates.

5. The figure plate set according to claim 1, wherein
the group of figure plates can form a regular dodecagon, and
the group of figure plates includes a figure plate of an isosceles triangle having an apex angle of 150° and base angles of 15°.

6. The figure plate set according to claim 1, wherein
the group of figure plates can form a regular dodecagon, and
the group of figure plates includes a figure plate of an isosceles triangle having an apex angle of 150° and base angles of 15°, a figure plate of an isosceles right triangle made by equally dividing the isosceles triangle into two, and a figure plate of a right triangle made by equally dividing a regular triangle into two.

7. The figure plate set according to claim 1, wherein
figure plates included in the group of figure plates are classified by color according to a shape.

* * * * *